(12) United States Patent
Quintus

(10) Patent No.: US 11,034,222 B2
(45) Date of Patent: Jun. 15, 2021

(54) TONNEAU COVER BED RAIL ASSEMBLY WITH CONNECTOR

(71) Applicant: UNDERCOVER, INC., Ann Arbor, MI (US)

(72) Inventor: James Gerard Quintus, Springfield, MO (US)

(73) Assignee: UNDERCOVER, INC., Ann Arbor, MI (US)

(*) Notice: Subject to any disclaimer, the term of this patent is extended or adjusted under 35 U.S.C. 154(b) by 0 days.

(21) Appl. No.: 16/594,750

(22) Filed: Oct. 7, 2019

(65) Prior Publication Data

US 2021/0101646 A1   Apr. 8, 2021

(51) Int. Cl.
B60J 7/10   (2006.01)

(52) U.S. Cl.
CPC ..................... B60J 7/102 (2013.01)

(58) Field of Classification Search
CPC ... B60J 7/041; B60J 7/068; B60J 7/085; B60J 7/0573; B60J 7/102; B60J 7/10; B60J 7/104; B60J 7/1607; B62D 35/00; B62D 37/02
See application file for complete search history.

(56) References Cited

U.S. PATENT DOCUMENTS

| | | | |
|---|---|---|---|
| 5,121,960 A | | 6/1992 | Wheatley |
| 5,553,652 A | * | 9/1996 | Rushford .............. B60J 7/102 296/100.18 |
| 5,934,735 A | * | 8/1999 | Wheatley .............. B60J 7/102 296/100.01 |
| 6,126,226 A | * | 10/2000 | Wheatley ................ B60J 7/10 296/100.01 |
| 6,942,279 B1 | * | 9/2005 | Hoover .................. B60J 7/10 135/88.05 |
| 9,849,765 B2 | | 12/2017 | Carlson |
| 10,525,804 B2 | * | 1/2020 | Pompili ................. B60J 7/141 |
| 2001/0050494 A1 | | 12/2001 | Rusu et al. |
| 2013/0341957 A1 | | 12/2013 | Garska |
| 2013/0341959 A1 | | 12/2013 | Garska |
| 2013/0341960 A1 | | 12/2013 | Garska |
| 2015/0001877 A1 | | 1/2015 | Fink |
| 2016/0200376 A1 | * | 7/2016 | Kerr, III ............... B60J 7/198 296/100.07 |
| 2017/0274746 A1 | | 9/2017 | Carlson |
| 2018/0147925 A1 | * | 5/2018 | Williamson ........... B60J 10/90 |
| 2018/0147926 A1 | * | 5/2018 | Shi ......................... B60J 7/198 |
| 2020/0353803 A1 | * | 11/2020 | Pompili ................. B60J 7/041 |

* cited by examiner

Primary Examiner — Jason S Morrow
(74) Attorney, Agent, or Firm — The Dohrusin Law Firm, P.C.

(57) ABSTRACT

A tonneau cover bed rail assembly that includes: a first bed rail section; a second rail section; and a connector configured to join together the first rail section and the second rail section. At least one seal arranged between an end of the first bed rail section and an end of the second bed rail section. The tonneau cover bed rail assembly is configured to extend along a length of a bed wall of cargo area of a pickup truck.

17 Claims, 6 Drawing Sheets

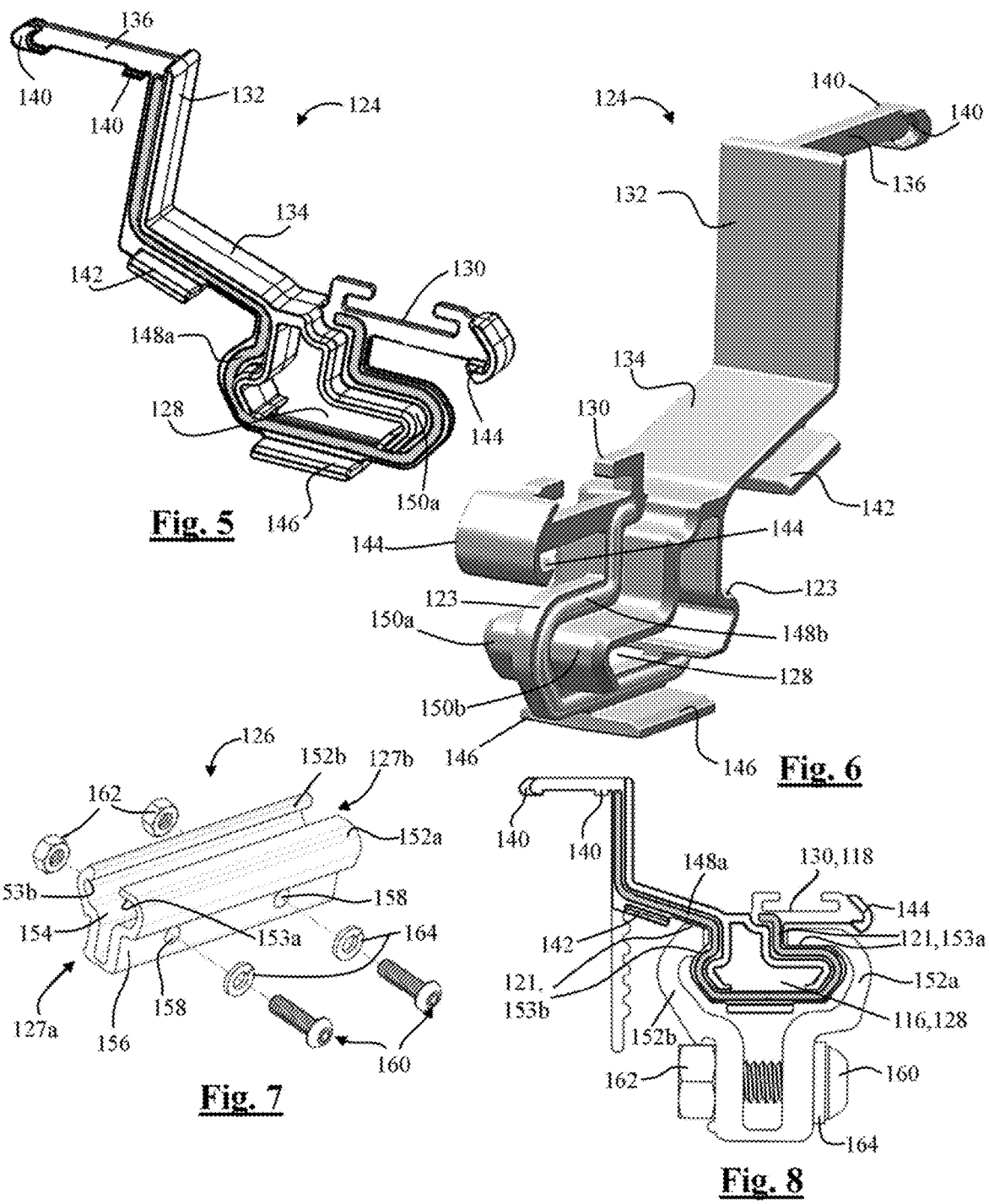

US 11,034,222 B2

TONNEAU COVER BED RAIL ASSEMBLY WITH CONNECTOR

FIELD

These teachings relate generally to a tonneau cover system, and more particularly to a bed rail assembly comprising a connector for joining together bed rail sections.

BACKGROUND

Tonneau cover systems include bed rails that are configured to be attached to the walls of a cargo area or bed of a vehicle, such as a pickup truck. A tonneau cover may then be attached to and/or supported on the bed rails to close or cover the cargo area or bed.

While many bed rails are suitable for their intended purpose, improvements may be desired. For example, some bed rails are made from a single, elongated bed rail section that extends generally the entire length of the cargo area or bed. Such elongated bed rail sections may be difficult or awkward to handle during manufacturing; may be too long to fit inside a standard shipping container; and/or may be difficult or awkward to install on the vehicle. Accordingly, it may be desirable to have a bed rail assembly that is constructed from two or more shorter bed rail sections, which may make handling of the bed rail sections less awkward and/or easier during manufacturing, shipping, and/or installation Recently, features have been added to tonneau cover systems to assist with fluid and/or debris management—that is, to restrict or prevent fluid and/or debris from entering the cargo area or bed of the vehicle. Therefore, while it may be desirable to have bed rail assemblies that are constructed from two or more shorter bed rail sections for the reasons mentioned above, it may also be desirable to have a connector that is configured to join together the bed rail sections in a fluid-tight and/or debris-tight formation to restrict or prevent fluid and/or debris from entering, flowing, or leaking between the bed rails sections in the areas they are connected together.

SUMMARY

These teachings provide a tonneau cover system, and more particularly a bed rail assembly. The bed rail assembly has at least two bed rail sections. Each of the at least two bed rail sections may have the same length or they may have different lengths (i.e., one bed rail section may be longer than the other). The at least two bed rail sections are joined together with a connector. The connector may be configured to join together the bed rail sections in a fluid-tight and/or debris-tight formation to restrict or prevent fluid and/or debris from flowing or leaking between the bed rails sections. The connector includes a coupler and an insert.

A tonneau cover bed rail assembly comprising: a first bed rail section; a second rail section; and a connector configured to join together the first rail section and the second rail section, the connector comprises at least one seal arranged between an end of the first bed rail section and an end of the second bed rail section. The tonneau cover bed rail assembly is configured to extend along a length of a bed wall of cargo area of a pickup truck.

BRIEF DESCRIPTION OF THE DRAWINGS

FIG. 5 is a perspective view of an insert of the bed rail assembly in FIGS. 3 and 4.
FIG. 6 is a perspective view of an insert from the bed rail assembly of FIGS. 3 and 4.
FIG. 7 is an exploded view of the coupler from the bed rail assembly of FIGS. 3 and 4.
FIG. 8 is a cross-sectional view of the bed rail assembly taken along line 8-8 in FIG. 3.

DETAILED DESCRIPTION

Figure 1:
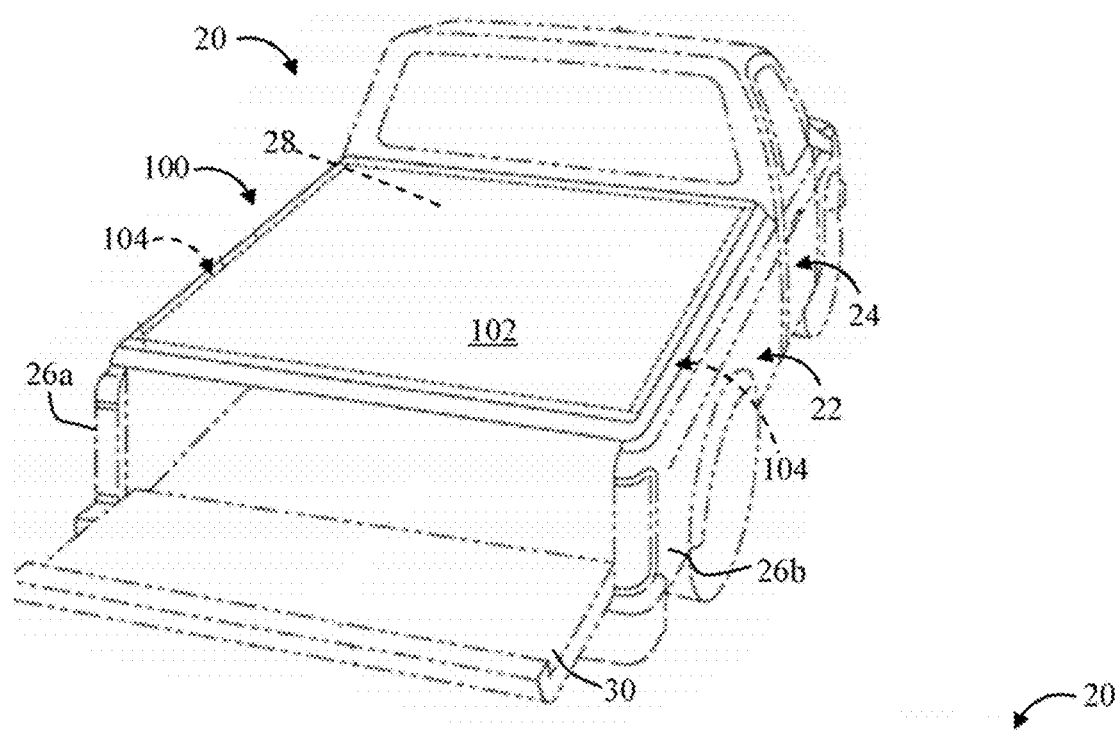
FIG. 1 is a perspective view of a vehicle.

FIG. 1 illustrates a vehicle 20. The vehicle 20 comprises a cargo area or bed 22 and a passenger area or cab 24. The cargo area 22 comprises walls that include: opposing side bed walls 26a, 26b, a front bed wall 28 that is located adjacent to the passenger cab 24, and a rear bed wall or tailgate 30.

A tonneau cover system 100 according to these teachings is configured to at least partially cover the cargo area 22. The tonneau cover system 100 comprises a tonneau cover 102 and one or more bed rail assemblies 104. In FIG. 1, the tonneau cover 102 is illustrated in a closed position or configuration.

Figure 2:
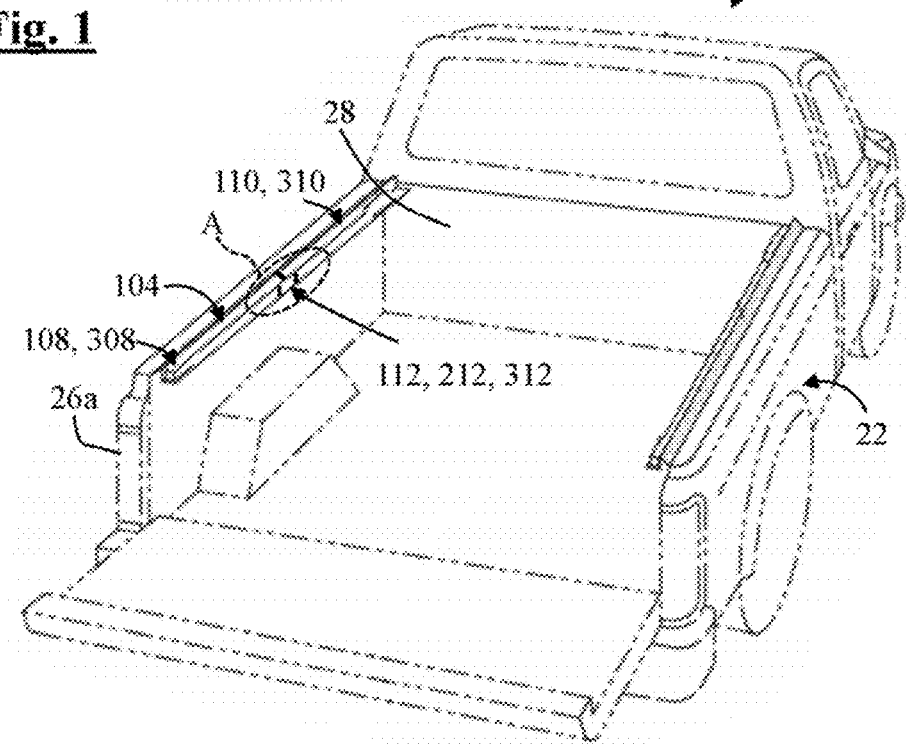
FIG. 2 is a perspective view of a vehicle.

With additional reference to FIG. 2, a bed rail assembly 104 according to these teachings is configured to be attached to one or more of the bed walls defining the cargo areas 22. While the following description focuses on the bed rail assembly 104 attached to the bed wall 26a (i.e., driver's side), it is understood that the bed rail assembly 104 can be attached to any of the bed walls 26a, 26b, 28, 30 defining the cargo area or bed 22. The bed rail assembly 104 comprises a first bed rail section 108 or 308, a second bed rail section 110 or 310, and a coupler 112 or 212 or 312.

Figure 3:
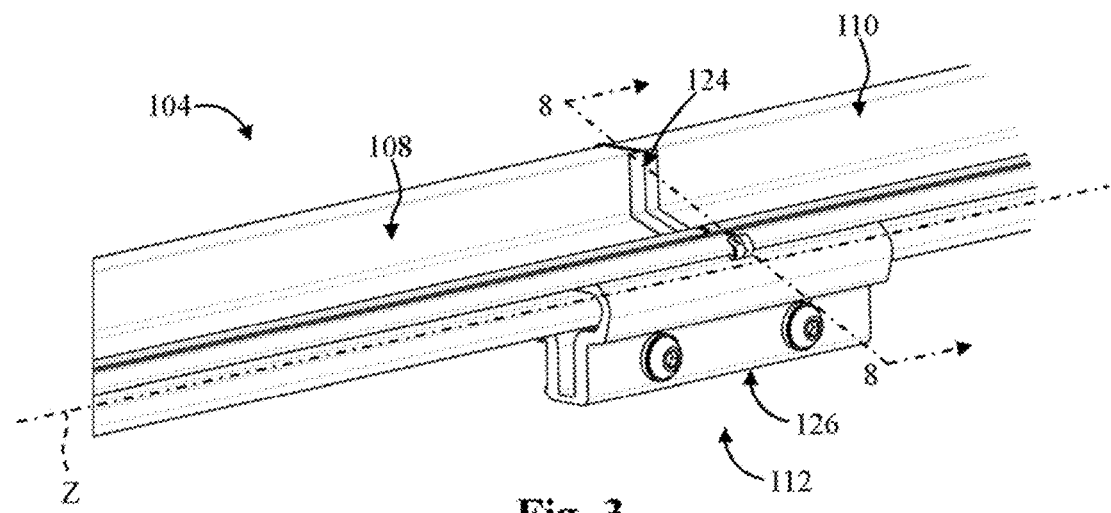
FIG. 3 is a close-up view of a portion of a bed rail assembly taken at area A in FIG. 2.

FIG. 3 is a close-up view of a portion of the bed rail assembly 104 taken at area A in FIG. 2. The bed rail assembly 104 comprises the first bed rail section 108, the second bed rail section 110, and the connector 112. The connector 212 comprises an insert 124 and a coupler 126. The bed rail assembly 104 is illustrated in the assembled position or configuration in FIG. 3.

The connector 112 is configured to connect or join together the first bed rail section 108 and the second bed rail section 110. The connector 112 is configured to connect or join together the first bed rail section 108 and the second bed rail section 110 in a fluid-tight and/or a debris-tight formation. A fluid-tight and/or debris-tight formation as discussed throughout these teachings means that fluid and/or debris are restricted or prevented from leaking, passing, seeping, or otherwise entering or falling between any of the interfaces or connection points, areas, surfaces, or feature where the bed rail sections 108, 110 (or 308, 310), the connector 112 (and/or 212, 312), the insert 124 (or 324), the coupler 126 (or 226, 326), or a combination thereof are connected or joined together or are positioned adjacent one another after the bed rail assembly 104 is assembled (i.e., in the position illustrated in FIG. 3 or FIG. 9 or FIG. 12).

Figure 4:
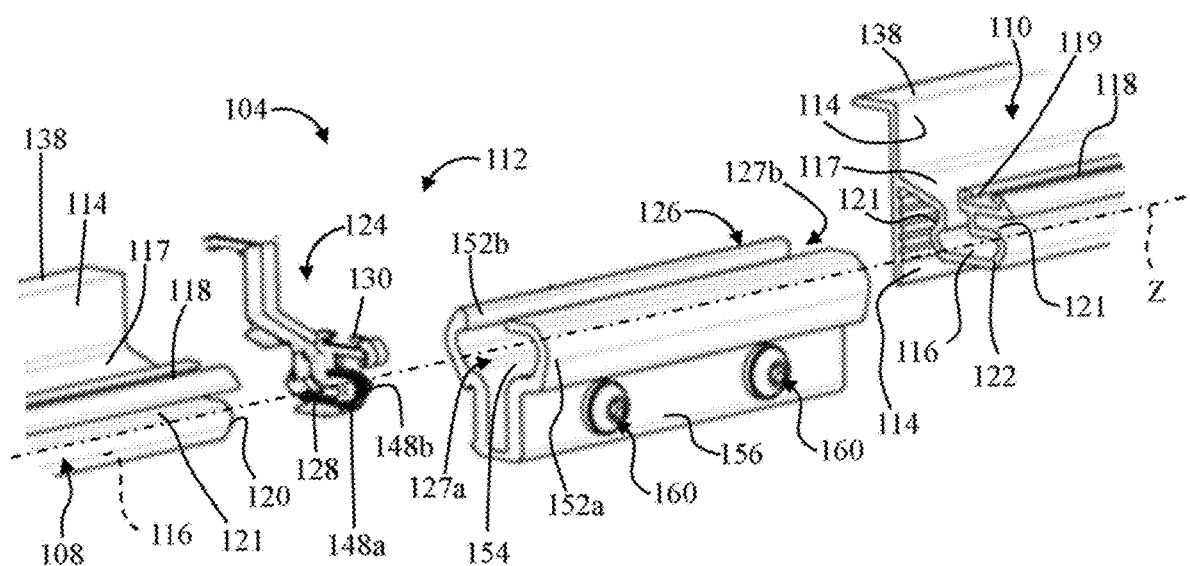
FIG. 4 is a partial exploded view of the bed rail assembly of FIG. 3.

Referring now to FIG. 4, each bed rail section 108, 110 may have substantially the same geometry and/or cross section. Each bed rail section 108, 110 comprises a back wall 114 and a top wall 138, one or both of which may be used for mounting or attaching the bed rail section 108, 110 to the corresponding bed wall 26a, 26b, 28, 30 of the cargo area 22 of the vehicle 20 (FIG. 2).

Each bed rail section 108, 110 comprises a drain channel 116 that cantilevers or extends from the back wall 114 via support wall 117; and a ledge 118 that cantilevers or extends from the drain channel 116. The top wall 138, the back wall 114, and/or the support wall 117 may be sloped in a direction of the drain channel 116 to assist in directing or guiding fluids and/or debris into the drain channel 116.

The ledge 118 may be configured to engage or contact a bottom surface of the tonneau cover 102 when the tonneau cover 102 is in a closed position (e.g., FIG. 1). The ledge 118 may include a groove or notch 119 for receiving or engaging a seal to contact or engage the bottom surface of the tonneau cover 102; however, in some configurations the seal may be attached to the bottom surface of the tonneau cover 102, which may contact the ledge 118 when the tonneau cover 102 is in the closed position.

The first bed rail section 108 comprises a first end or face 120, and the second bed rail section 110 comprises a second end or face 122 that faces or is arranged in opposition to the first end 120 of the first bed rail section 108.

Each bed rail section 108, 110 comprises one or more engagement sections 121. A bed rail engagement section 121 may be any area of the bed rail section 108, 110 that is configured to be engaged by or in contact with the coupler 112 when the bed rail assembly 104 is assembled. For example, the bed rail engagement section 121 may be defined as the outer surface or portion of the drain channel 116. The bed rail engagement section 121 may be an outer surface of the drain channel 116 in a region at, below, or under the ledge 118; an outer surface of the drain channel 116 in a region at, below, or under the support wall 117; or both. Other areas of the bed rail sections 108, 110 that may include a bed rail engagement section 121 may be any surface or region of the ledge 118, the support wall 117, the back wall 114, the top wall 138, the drain channel 116, or a combination thereof.

The connector 112 comprises an insert 124 and a coupler 126. The insert 124 may have a geometry or cross section that is generally the same as a geometry or cross section of one or both of the bed rail sections 108, 110.

With additional reference to FIGS. 5 and 6, the insert 124 comprises an insert drain channel 128 and an insert ledge 130, one or both of which generally corresponds in geometry and function to the drain channel 116 and ledge 118 of the first and second bed rail sections 108, 110

The insert 124 comprises a back wall 132 and a support wall 134, one or both of which slope in a direction of the insert drain channel 128 to direct or guide fluids and/or debris into the drain channel 116 of the bed rail sections 108, 110, into the support walls 117 of the bed rail sections 108, 110, and/or into the insert drain channel 128. The insert 124 has a top wall 136 that is configured to engage, contact, or be located adjacent the corresponding top wall sections 138 of the bed rail sections 108, 110.

The insert 124 may comprise one or more supports 140, 142, 144, 146. The one or more supports 140, 142, 144, 146 may be configured to contact, engage, join together and/or retain together the bed rail section 108, 110 and the insert 124. As further discussed below, the one or more of the supports 140, 142, 144, 146 may function to engage, contact and/or connect the corresponding edges, surfaces, or features of the bed rail sections 108, 110 to the insert 124 to add stability, rigidity, and/or robustness to the connection with the insert 124. The connection between the one or more supports 140, 142, 144, 146 and the corresponding edges, surfaces, or features of the bed rail sections 108, 110 may be a friction fit or connection, a snap fit or connection, and/or an interference fit or connection after the corresponding features are brought together and engage one another. In some configurations, the connection between the one or more supports 140, 142, 144, 146 and the corresponding edges, surfaces, or features of the bed rail sections 108, 110 may be increased or strengthened by way of one or more adhesives, seals, undercuts, and/or other fasteners.

The one or more first supports 140 may be located on the top wall 136 for engaging, contacting, and/or retaining the top wall sections 138 of the bed rail sections 108, 110. The one or more second supports 142 may be located on the support wall 134 for engaging, contacting, and/or retaining the support walls 117 of the bed rail sections 108, 110. For example, a support wall 117 of the bed rail sections 108, 110 may be configured to fit into a channel or gap defined between the second support 142 and the support wall 134. The one or more third supports 144 may be located the insert ledge 130 for engaging, contacting, and/retaining a portion of the ledge 119 of the bed rail sections 108, 110. one or more fourth supports 146 may be located a bottom portion of the insert 124 and/or drain channel 128 for engaging, contacting, and/retaining a portion or bottom surface of the drain channel 116 of the bed rail sections 108, 110.

The insert 124 comprises one or more engagement features 123. An engagement feature 123 of the insert 124 may be one or more feature(s) or surface(s) of the insert 124 that are configured to be contacted or engaged by the coupler 126 when the bed rail assembly 104 is assembled. For example, referring to FIG. 6, the engagement feature 123 of the insert 124 may be a surface or edge of the insert 124 that surrounds the insert drain channel 128 and/or is located under or below the insert ledge 130, the insert support wall 134, or both.

The insert 124 has two opposing sides, each one of which faces a respective edge 120, 122 of the bed rail sections 108, 110 (FIG. 4). One or both sides of the insert 124 comprises a seal 148a, 148b. The seals 148a, 148b may extend at least partially or wholly around a perimeter of the insert drain channel 128; may extend along at least a portion or a whole of the support wall 134; may extend along at least a portion or a whole of the back wall 132. Additionally, or alternatively in some configurations, the seal 148a, 148b may extend along at least a portion or a whole of the top wall 136; may extend along at least a portion or a whole of the insert ledge 130; or a combination thereof. One or both of the seals 148a, 148b may be a single, elongated monolithic seal that extends partially or wholly along one or more of the aforementioned portions of the insert 124, or may be comprised of two or more seal sections that extend partially or wholly along one or more of the aforementioned portions of the insert 124. The seals 148a, 148b may function to restrict or prevent fluids and/or debris from leaking, seeping, draining, or otherwise entering or falling between the edges 120, 122 of the bed rail sections 108, 110 and the insert 124 so that the connector 112 can connect the bed rail sections 108, 110 in a fluid and/or debris-tight formation. When the bed rail assembly 104 is assembled, the edges 120, 122 of the bed rail sections 108, 110 are configured to contact and/or compress the seals 148a, 148b to form a fluid-tight and/or debris-tight connection between the bed rail sections 108, 110 and the insert 124.

The insert 124 may comprise a first and a second projection 150a, 150b. The projections 150a, 150b extend or project from each side of the insert 124. Each projection 150a, 150b may be sized slightly smaller than the drain channel 116 of the corresponding rail section 108, 110. When the bed rail assembly 104 is assembled (i.e., FIG. 3), the first and/or second projection 150a, 150b are configured to be received into the corresponding drain channel 116 of the corresponding rail section 108, 110.

After the bed rail assembly 104 is in an assembled configuration illustrated in FIG. 3, the drain channels 116, 128 of the bed rail sections 108, 110 and insert 124 are connected together. The drain channels 116, 128 may be aligned along a common axis Z. Accordingly, the connected drain channels 116, 128 may be used to retain and/or provide a passageway for guiding or directing fluid and/or debris within the drain channels 116, 128 along a length of the bed rail assembly 104 rather than the fluid and/or debris flowing or falling into the cargo area or bed 22 of the vehicle 20.

With reference to FIGS. 4, 7, and 8, the coupler 126 has a generally Y-shaped cross section. The coupler 126 comprises two opposing open ends 127a, 127b. The coupler 126 comprises opposing arms 152a, 152b that define a channel 154 therebetween. The arms 152a, 152b are sized and configured to at least partially surround an outer surface or portion of the drain channel 116, 128 of the rail sections 108, 110 and insert 124 when the bed rail assembly 104 is assembled (FIG. 3).

The coupler 126 includes one or more engagement features. An engagement feature may be any feature, surface or element of the coupler 126 that is configured to contact or engage the insert 124 and/or the rail sections 108, 110 when the bed rail assembly 104 is assembled to retain the insert and/or rail sections 108, 110 in the channel 154 of the coupler 126. For example, the coupler 126 may include engagement features 153a, 153b that may be portions of the arms 152a, 152b.

The coupler 126 comprises a base 156. The base 156 may include one or more bores 158 that extend from a first side of the base 156 or arm 152a to a second side of the base 156. A fastener 160 is configured to extend through the bores 158 from the first side to the second side. A nut 162 may be located on the other side of the base 156 for the fastener 160 to threadably engage. In some configurations, one or more of the bores 158 may be threaded and the nut 162 may be omitted. One or more washers 164 or spring washers may be located on one or both sides of the base 156.

The bed rail assembly 104 can be assembled according to a method. The method may include one or more of the following steps. One or more of the following steps can be performed in a different order. One or more of the following steps can be repeated or omitted. Two or more of the following steps can be combined into a single step. One or more of the following steps can be separated or slit into multiple steps.

The method of assembling the bed rail assembly 104 may include: inserting or sliding the insert 124 into the channel 154 of the coupler 126 via either the first open end 127a or the second open end 127b. The bed rail sections 108, 110 can be inserted or slid into the corresponding open ends 127a, 127b of the coupler 126 until the ends 120, 122 of the bed rail sections 108, 110 are located adjacent to or in contact with surfaces of the insert 124 and/or the seals 148a, 148b of the insert 124. One or both of the seals 148a, 148b may be in contact with the ends 120, 122 of the bed rail sections 108, 110, compressed by the ends 120, 122 of the bed rail sections 108, 110, or may be located adjacent to the ends 120, 122 of the bed rail sections 108, 110 (i.e., free of contact with the ends 120, 122 of the bed rail sections 108, 110). The first and second projections 150a, 150b may engage or be received into the corresponding drain channel 160 of the rail section 108, 110 The one or more supports 140, 142, 144, 146 of the insert 124 may engage, contact and/or connect with the corresponding edges, surfaces, or features of the bed rail sections 108, 110.

The method may include a step of tightening or engaging one or more of the fasteners 160, causing the arms 152a, 152b or engagement features 153a, 153b to apply a compressive force or pressure onto the rail sections 108, 110 and the insert 124. More specifically, when the fasteners 160 are tightened, the engagement features 153a, 153b are configured to engage or apply a compressive force or pressure onto the engagement sections 121, 123 of the bed rail sections 108, 110 and insert 124. This serves to secure or lock together the components of the bed rail assembly 104 so that the rail sections 108, 110 are not readily separable from the coupler 112. Moreover, this serves to lock or engage the rail sections 108, 110 in a fluid-tight and/or debris-tight formation.

The bed rail assembly 104 may then be attached to one or more walls 26a, 26b, 28, 30 defining the cargo area 22 of the vehicle 20.

Figure 9:
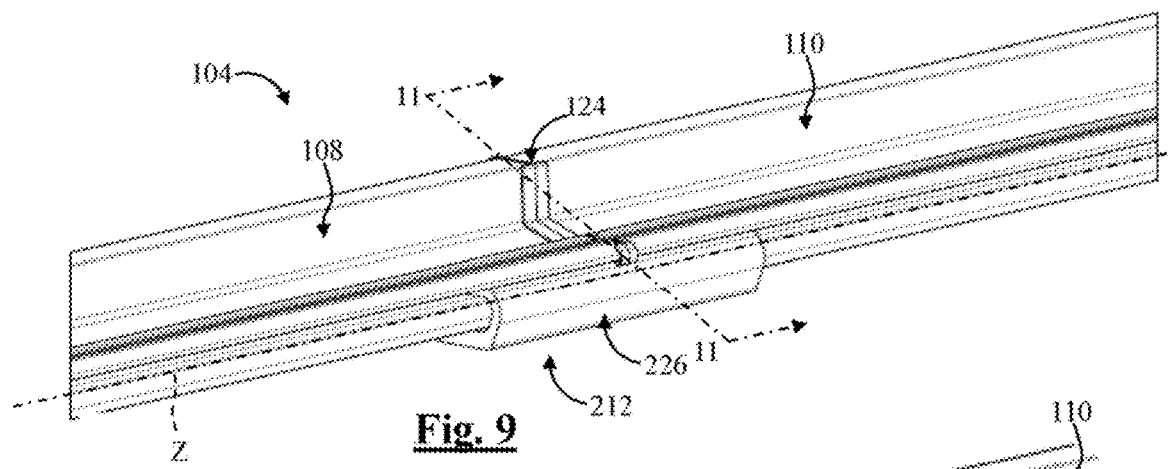
FIG. 9 is a close-up view of a portion of a bed rail assembly taken at area A in FIG. 2.

FIG. 9 is a close-up view of a portion of the bed rail assembly 104 taken at area A in FIG. 2. The bed rail assembly 104 comprises a first bed rail section 108 and a second bed rail section 110, both of which are substantially similar in geometry and function to the bed rail sections 108, 110 illustrated in FIGS. 3 and 4 and described above. Therefore, common elements of the bed rail sections 108, 110 in the figures are not introduced and described again.

The bed rail assembly 104 of FIG. 9 comprises a connector 212 that, like the connector 112 described above, is configured to connect or join together the first bed rail section 108 and the second bed rail section 110. The connector 212 is configured to connect or join together the first bed rail section 108 and the second bed rail section 110 in the fluid-tight and/or the debris-tight formation.

Figure 10:
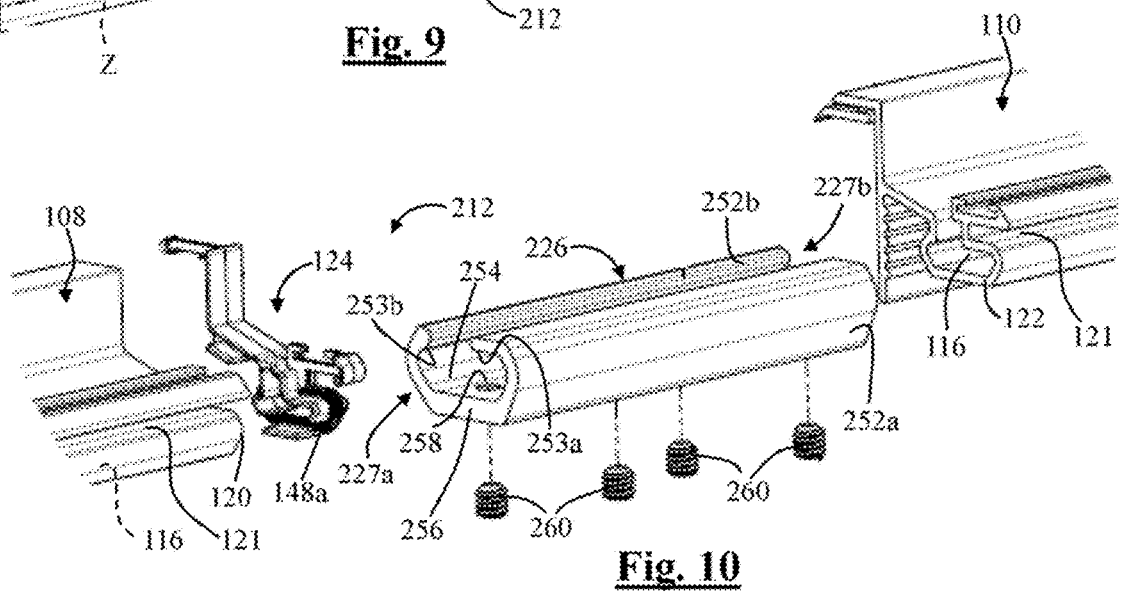
FIG. 10 is an exploded view of the bed rail assembly of FIG. 9.
Figure 11:
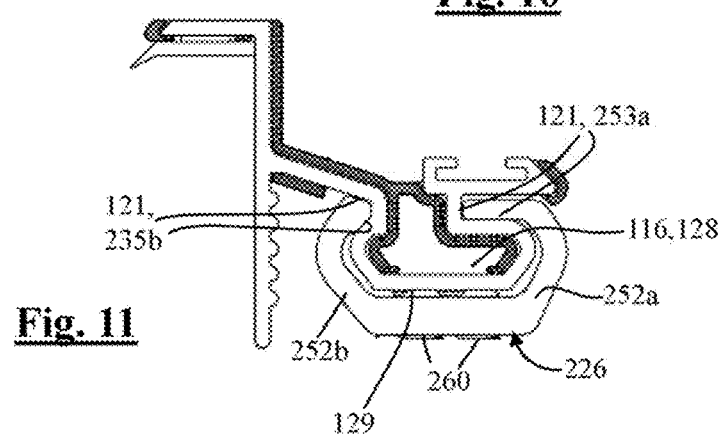
FIG. 11 is a cross-sectional view of the bed rail assembly taken along line 11-11 in FIG. 9.

The connector 212 comprises an insert 124 and a coupler 226. The insert 124 in FIGS. 9-11 has substantially the same geometry and function as the insert illustrated in FIGS. 3-8 and described above. Therefore, the common elements of the insert 124 in FIGS. 9-11 with FIGS. 3-8 are not introduced and described again.

The coupler 226 has a generally C-shaped or U-shaped cross section. The coupler 226 comprises two opposing arms 252a, 252b that define a channel 254 therebetween. The arms 252a, 252b are sized and configured to at least partially surround an outer surface or portion of the drain channel 116, 128 of the rail sections 108, 110 and insert 124 when the bed rail assembly 104 is assembled (FIG. 9).

The coupler 226 includes one or more engagement features. An engagement feature may be any feature, surface or element of the coupler 226 that is configured to contact or engage the insert 124 and/or the rail sections 108, 110 when the bed rail assembly 104 is assembled to retain the insert and/or rail sections 108, 110 in the channel 154 of the coupler 126. For example, the coupler 226 may include engagement features 253a, 253b that may be portions of the arms 252a, 252b. The engagement portions 253a. 253b may be hooked or have undercuts that function to contact or engage the insert 124.

The coupler 226 comprises a base or bottom section 256 that joins together the arms 252a, 252b. The bottom section 256 includes one or more bores 258 that extend to the channel 254. The one or more bores 258 of the coupler 226 may be threaded. A fastener 260 is configured to engage the bore 258.

The bed rail assembly 104 of FIG. 9 can be assembled according to a method. The method may include one or more of the following steps. One or more of the following steps can be performed in a different order. One or more of the following steps can be repeated or omitted. Two or more of the following steps can be combined into a single step. One or more of the following steps can be separated or slit into multiple steps.

The method of assembling the bed rail assembly 104 may include: inserting or sliding the insert 124 into the channel 254 of the coupler 226 via either the first open end 227a or the second open end 227b. The bed rail sections 108, 110 can be inserted or slid into the corresponding open ends 227a, 227b of the coupler 226 until the ends 120, 122 of the bed rail sections 108, 110 are located adjacent to or in contact with surfaces of the insert 124 and/or the seals 148a, 148b of the insert 124 (See seals 148a, 148b at FIGS. 5/6). One or both of the seals 148a, 148b may be in contact with the ends 120, 122 of the bed rail sections 108, 110, compressed by the ends 120, 122 of the bed rail sections 108, 110, or may be located adjacent to the ends 120, 122 of the bed rail sections 108, 110 (i.e., free of contact with the ends 120, 122 of the bed rail sections 108, 110). The first and second projections 150a, 150b (See projections 150a, 150b at FIG. 6) may engage or be received into the corresponding drain channel 160 of the rail section 108, 110. The one or more supports 140, 142, 144, 146 (See supports 140, 142, 144, 146 at FIG. 6) of the insert 124 may engage, contact and/or connect with the corresponding edges, surfaces, or features of the bed rail sections 108, 110.

The method may include a step of tightening or engaging one or more of the fasteners 260, which causes the fasteners 260 to project into the channel 254 and contact a bottom surface 129 of the insert 124. This engagement functions to lock, prevent, or restrict movement of the insert 124 inside of the coupler 226. Because the rail sections 108, 110 are engaged with the insert 124 by way of the projections 150a, 150b engaging the corresponding drain channel 160 of the rail section 108, 110 and the one or more supports 140, 142, 144, 146 engaging the corresponding edges, surfaces, or features of the bed rail sections 108, 110, the rail sections 108, 110 are also restricted or prevented from moving within the channel 254 or relative to the coupler 226.

Tightening the one or more fasteners 260 also functions to move or displace the insert 124 within the channel 226 such that the insert 124 is moved into contact with or against the engagement features 253a, 253b of the coupler 226 to lock, prevent, or restrict movement of the insert 124 inside of the coupler 226.

Figure 12:
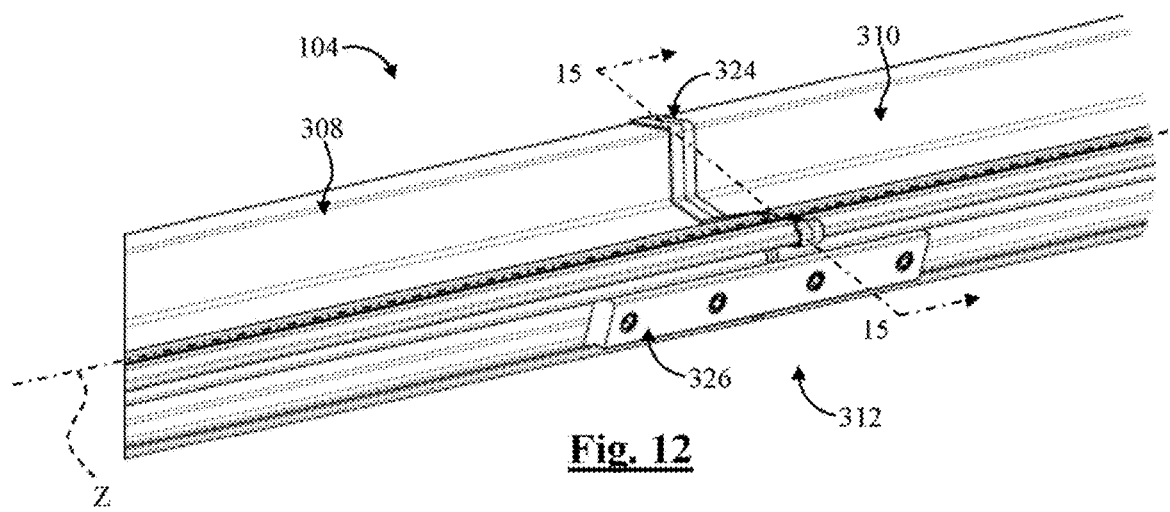
FIG. 12 is a close-up view of a portion of a bed rail assembly taken at area A in FIG. 2.

FIG. 12 is a close-up view of a portion of the bed rail assembly 104 taken at area A in FIG. 2. The bed rail assembly 104 comprises the first bed rail section 308, the second bed rail section 310, and the connector 312. The connector 312 comprises an insert 324 and a coupler 326. The bed rail assembly 104 is illustrated in the assembled position or configuration in FIG. 12.

Like the connectors 112, 212 discussed above, the connector 312 is configured to connect or join together the first bed rail section 308 and the second bed rail section 310. The connector 312 is configured to connect or join together the first bed rail section 308 and the second bed rail section 310 in the fluid-tight and/or a debris-tight formation.

Figure 13:
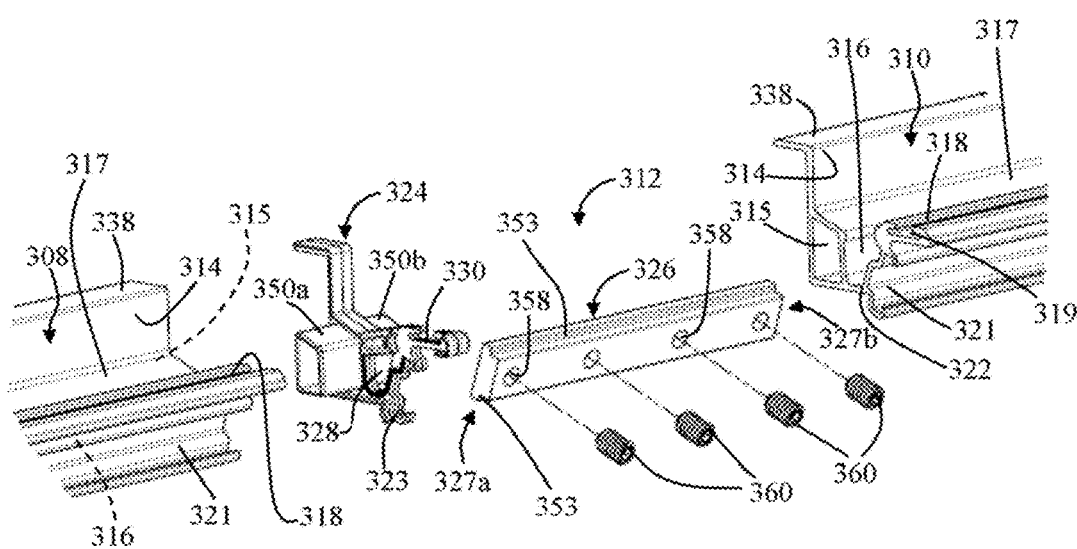
FIG. 13 is an exploded view of the bed rail assembly of FIG. 12.

Referring now to FIG. 13, each bed rail section 308, 310 may have substantially the same geometry and/or cross section. Each bed rail section 308, 310 comprises a back wall 314 and a top wall 338, one or both of which may be used for mounting or attaching the bed rail section 308, 310 to the corresponding bed wall 26a, 26b, 28, 30 of the cargo area 22 of the vehicle 20 (FIG. 2).

Each bed rail section 308, 310 comprises a drain channel 316 that cantilevers or extends from the back wall 314 via support wall 317; and a ledge 318 that cantilevers or extends from the drain channel 316. The top wall 338, the back wall 314, and/or the support wall 317 may be sloped in a direction of the drain channel 316 to assist in directing or guiding fluids and/or debris into the drain channel 316.

Like the ledge 118, ledge 318 may be configured to engage or contact a bottom surface of the tonneau cover 102 when the tonneau cover 102 is in a closed position (e.g., FIG. 1). The ledge 318 may include a groove or notch 319 for receiving or engaging a seal to contact or engage the bottom surface of the tonneau cover 102; however, in some configurations the seal may be attached to the bottom surface of the tonneau cover 102, which may contact the ledge 318 when the tonneau cover 102 is in the closed position.

The first bed rail section 308 comprises a first end or face like end or face 120, and the second bed rail section 310 comprises a second end or face 322 that faces or is arranged in opposition to the first end of the first bed rail section 308.

Each bed rail section 308, 310 comprises an engagement opening 315, which may be an opening or channel that is configured to engage or receive a respective first and a second projection 350a, 350b of the insert 324 described below when the bed rail assembly 104 is assembled to add strength and rigidity to the assembly 104. The engagement opening 315 is defined below the support wall 317 and adjacent to the drain channel 316.

Each bed rail section 308, 310 comprises one or more engagement sections 321. An engagement section 321 may be any area of the bed rail section 308, 310 that is configured to be engaged by or in contact with the coupler 312 when the bed rail assembly 104 is assembled. The engagement section 321 may be any part of the bed rail section 308, 310. For example, the engagement section 321 may be defined as the outer surface or portion of the drain channel 316. More specifically, the engagement section 321 may be an outer surface of the drain channel 316 in a region at, below, or under the ledge 318. The engagement section 321 may be located inboard of the drain channel 316 after the bed rail assembly 104 is installed in vehicle position. The engagement section 321 may have a cross section that is C-shaped, U-shaped, Y-shape, or virtually any cross-sectional shape that can engage a complimentary geometry of the coupler 312.

The connector 312 comprises an insert 324 and a coupler 326. The insert 124 may have a geometry or cross section that is generally the same as a geometry or cross section of one or both of the bed rail sections 308, 310.

With additional reference to FIGS. 5 and 6, the insert 324 comprises an insert drain channel 328 and an insert ledge 330, one or both of which generally corresponds in geometry and function to the drain channel 316 and ledge 318 of the first and second bed rail sections 308, 310.

The insert 324 comprises a back wall 332 and a support wall 334, one or both of which slope in a direction of the insert drain channel 328 to direct or guide fluids and/or debris into the drain channel 316 of the bed rail sections 308, 310, into the support walls 317 of the bed rail sections 308, 310, and/or into the insert drain channel 328. The insert 324 has a top wall 336 that is configured to engage, contact, or be located adjacent the corresponding top wall sections 338 of the bed rail sections 308, 310.

The insert 124 may comprise one or more supports, like the supports 140, 142, 144, 146 described above. The one or more supports may be configured to join together and/or retain together the bed rail section 308, 310 and the insert 324.

Figure 14:
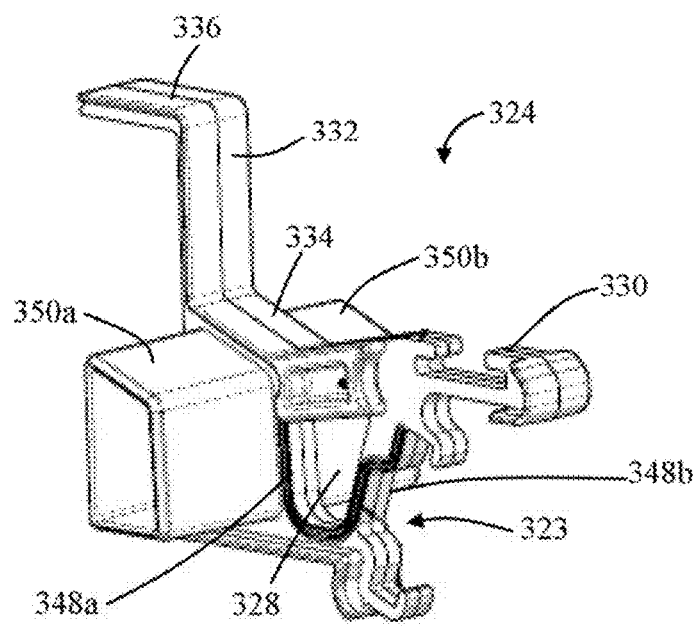
FIG. 14 is a perspective view of an insert from the bed rail assembly of FIGS. 12 and 13.
Figure 15:
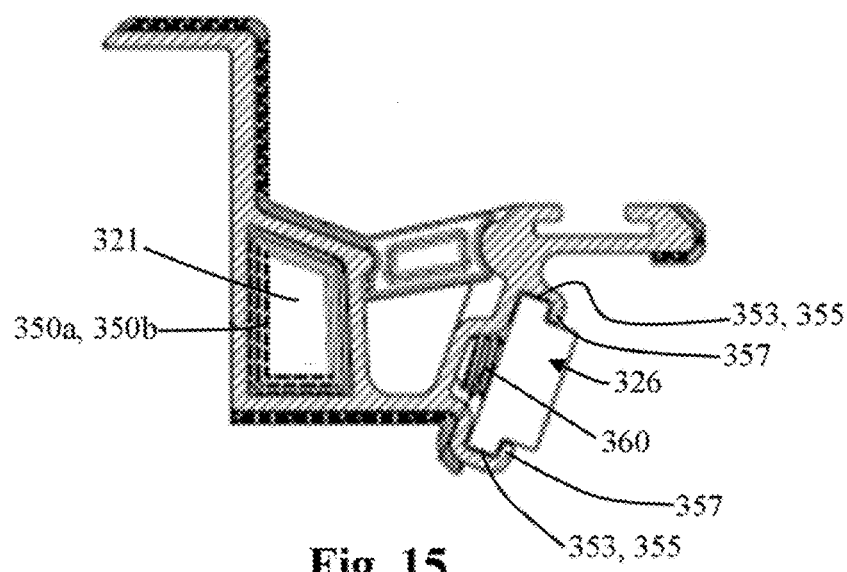
FIG. 15 is a cross-sectional view of the bed rail assembly taken along line 15-15 in FIG. 12.

The insert 324 comprises one or more engagement features 323. An engagement feature 323 of the insert 324 may be one or more feature(s) or surface(s) of the insert 324 that are configured to be contacted or engaged by the coupler 326 when the bed rail assembly 104 is assembled. For example, referring to FIG. 14, the engagement feature 323 of the insert 324 may be a surface or edge of the insert 324 that is located adjacent to the insert drain channel 328. The engagement section 323 may be located inboard of the drain channel 328 after the bed rail assembly 104 is installed in vehicle position. The engagement section 323 may have a cross section that is C-shaped, U-shaped, Y-shape, or virtually any cross-sectional shape that can engage the geometry of the coupler 312. The engagement section 323 may have a cross section that is substantially the same as a cross section of the engagement section 321 on one or both of the bed rail sections 308, 310.

The insert 324 has two opposing sides, each one of which faces a respective edge 320, 322 of the bed rail sections 308, 310. Like the insert 124 above, one or both sides of the insert 324 comprises a seal 348a, 348b. The seals 348a, 348b may extend at least partially or wholly around a perimeter of the insert drain channel 328; may extend along at least a portion or a whole of the support wall 334; may extend along at least a portion or a whole of the back wall 332. Additionally, or alternatively in some configurations, the seal 348a, 348b may extend along at least a portion or a whole of the top wall 336; may extend along at least a portion or a whole of the insert ledge 330; or a combination thereof. One or both of the seals 348a, 348b may be a single, elongated monolithic seal that extends partially or wholly along one or more of the aforementioned portions of the insert 324, or may be comprised of two or more seal sections that extend partially or wholly along one or more of the aforementioned portions of the insert 124. The seals 348a, 348b may function to restrict or prevent fluids and/or debris from leaking, seeping, draining, or otherwise entering or falling between the edges 320, 322 of the bed rail sections 308, 310 and the insert 324 so that the connector 312 can connect the bed rail sections 308, 310 in a fluid and/or debris-tight formation. When the bed rail assembly 104 is assembled, the edges 320, 322 of the bed rail sections 308, 310 are configured to contact and/or compress the seals 348a, 348b to form a fluid-tight and/or debris-tight connection between the bed rail sections 308, 310 and the insert 324.

The insert 324 may comprise a first and a second projection 350a, 350b. The projections 350a, 350b extend or project from each side of the insert 324. Each projection 350a, 350b may be sized slightly smaller than the engagement opening 321 in the bed rail sections 308, 310 when the bed rail assembly 304 is assembled to add strength and rigidity to the assembly 304.

After the bed rail assembly 304 is in an assembled configuration illustrated in FIG. 12, the drain channels 316, 328 of the bed rail sections 308, 310 and insert 324 are aligned along a common axis Z. Accordingly, the connected drain channels 316, 328 may be used to retain and/or provide a passageway for guiding or directing fluid and/or debris within the drain channels 316, 328 along a length of the bed rail assembly 304 rather than the fluid and/or debris flowing or falling into the cargo area or bed 22 of the vehicle 20.

With reference to FIG. 13, the coupler 326 has a generally T-shaped cross section. The coupler 326 comprises two opposing open ends 327a, 327b.

The coupler 326 includes one or more engagement features. An engagement feature may be any feature, surface or element of the coupler 326 that is configured to contact or engage the insert 324 and/or the rail sections 308, 310 when the bed rail assembly 104 is assembled to retain the insert and/or rail sections 308, 310 from separating or moving relative to each other. For example, the engagement features 353 may be a stepped or notched portion or region of the coupler 326 that is configured to be received into a corresponding slot or channel 355 in the rail sections 308, 310 and retained in the channel 355 by a finger 357 defining the channel 355.

The coupler 326 one or more bores 358. A fastener 360 is configured to extend through the bores 358. The bores 358 may be threaded.

The bed rail assembly 104 of FIGS. 12-15 can be assembled according to one or more method steps that include inserting or sliding the coupler 326 into the engagement section 321 of one of the bed rail sections 308, 310. The coupler 326 can be slid into or inserted into the engagement feature 323 off the insert 324. The coupler 326 can be inserted or slid into the engagement section 321 of the other of the bed rail section 308, 310. The insert 324 can be sandwiched between the bed rail sections 308, 310 so that the first and second projections 350a, 350b engaged or are positioned inside of the engagement openings 315 of the bed rail sections 308, 310. The insert 324 can be sandwiched between the bed rail sections 308, 310 so that the edges or faces of the bed rail sections 308, 310 contact, compress, or are located adjacent to the seal 348a, 348b of the insert 324. One or more of the fasteners 360 can then be tightened or advanced into the bores 358 so that the fasteners 360 contact the engagement sections 321, 323 of the bed rail sections 308, 310 and insert 324.

The vehicle discussed herein may be any vehicle that has a cargo area or bed. The cargo area or bed may be any area or portion of the vehicle used for storing or transporting goods or cargo. The cargo area may be any part of the vehicle that has an open top or an open side. The open top or the open side can be at least partially closed or covered by a cover, which may be a trunk, decklid, tonneau cover, cap, tent, tarp, board, or a combination thereof. The cargo area may be a cargo box, a bed, a trunk, or a combination thereof. The cargo area may also be a trailer that is configured to be pulled or pushed by the vehicle.

The tonneau cover discussed herein may be any cover that is located on top of the open top or open side of the cargo bed. The tonneau cover may function to protect against dirt, debris, fluid, and/or other contaminants from entering an inside of a cargo area. The tonneau cover may function to conceal the inside of the cargo area and/or contents inside the vehicle bed. The tonneau cover may comprise one or a plurality of panels. The one or more of the panels can be moved or repositioned relative to one another and/or relative to the cargo area to move the tonneau cover between an open configuration and a closed configuration. The open configuration is where one or all of the panels are moved to provide access to the cargo area. The closed configuration is where one or all of the panels at least partially cover the cargo area.

The one or more panels may be configured to be roll-up into a closed configuration and unrolled into the open configuration. The one or more panels may be configured to be folded-up into a closed configuration and then unfolded into the open configuration. In some configurations, the tonneau cover may be a single panel cover. The single panel can be raised or pivoted relative to the walls or top surfaces of the vehicle bed and/or tailgate to move the tonneau cover from the closed configuration to the open configuration, and then lowered or pivoted downwards to the closed configuration.

One or more of the panels may be substantially rigid. One or more of the panels may be substantially flexible, but stabilized with a rigid frame. The tonneau cover may be a canvas, fabric, a folded, or roll-up type tonneau cover. In some configurations, the tonneau cover may also be a truck cap or tent or other cover that increases a height of a cargo area.

The bed rail assembly discussed herein is a structure configured to attach or support the tonneau cover to the vehicle or cargo bed. The bed rail system assembly comprises two or more bed rail sections that are joined together with a connector. The bed rail sections may be the same length or the bed rail sections may have different lengths (i.e., one bed rail section may be longer than another of the bed rail sections). In this regard, one of the bed rail sections may be a standard length that can be provided for various cargo area or bed sizes, while the second bed rail section is of a varying length depending on the length or size of the cargo area.

The bed rails or the bed rail assembly can be attached to one or more of the walls defining a cargo area via a suitable attachment method that may include one or more clamps, screws, fasteners, adhesives, welds, etc.

The bed rails may be an elongated component that is made of extruded and/or molded aluminum, metal, plastic, or a combination thereof. The bed rails may have virtually any cross section or geometry. Preferably, the geometry of the two bed rails is the same, however, in some configurations the geometry of the two bed rail sections that are attached or joined together with the connector may be different. In such a configuration, each side of the insert facing a corresponding edge or face of the bed rail section may be the same as the corresponding bed rail section such that the insert has a different geometry on each side.

The insert discussed herein is provided between or adjacent two bed rail sections. The insert functions to provide an interface or sealing area or connection between the two bed rail sections to maintain the fluid-tight and/or the debris-tight formation. An insert may include any one or combination of the structure described and illustrated herein. Alternatively, the insert may include only one or more of the seals that are part of the inserts described herein. The inserts may include one or more supports or other attachment features for maintaining an engagement or connection with the two bed rail sections. In this regard, the coupler may be omitted in some configurations. In other configurations, the insert may be omitted between the two rail sections, and only the coupler may be used to join the bed rail sections together. In such a configuration, one or more seals may be provided between the two edges of the bed rail sections. In some configurations, the insert and the coupler may be formed as a single component. In some configurations, the coupler may have one or more seals that are configured to be placed between the two bed rail sections. The insert may be formed from a plastic material, and the seal may be attached to the insert. In other configurations, the seal and the insert may be co-molded together.

The bed rail assembly includes at least coupler. Preferably, the bed rail assembly includes a coupler at least location where two bed rail sections are joined together or arranged adjacent to one another. The coupler may function to maintain the fluid-tight and/or debris-tight formation between the adjacent bed rail sections. The coupler may include one or more bores and/or fasteners that are configured to engage the coupler to tighten the coupler onto the insert, bed rail sections, or both to maintain the fluid-tight and/or debris-tight formation. The fasteners may engage a threaded or thread-free bore. Two or more of the fasteners may engage the coupler in a common direction. Two or more of the fasteners may engage the coupler in different directions.

The coupler may function to apply a compressive force onto the bed rail sections and insert to join together the bed rail sections and insert. The compressive force may function to form the fluid-tight and/or debris-tight formation that functions to restrict or prevent fluid and/or debris from seeping or leaking or falling between any interfaces or areas there the bed rail sections and insert are connected together or joined together or arranged adjacent to one another.

The bed rail assembly includes at least one seal. The seal may be provided on the insert; on the opposing surfaces or faces of the bed rail sections; or both. The seals may function to provide the fluid-tight and/or debris-tight formation. The seals may be attached to the insert and/or the edges of the bed rail sections after the insert and/or bed rail sections are formed. The seals may be co-molded or co extruded with the insert and/or bed rail section. The seal may be made from a rubber or complaint member. For example, the seal may be made of a rubber, TPU, EPDM, or other suitable material.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A tonneau cover bed rail assembly comprising:
a first bed rail section configured for attachment to a bed wall of a cargo area of a vehicle, the first bed rail section comprising a region configured to support a tonneau cover when the tonneau cover is in a closed position and be free of contact with the tonneau cover when the tonneau cover is in an open position;
a second bed rail section configured for attachment to the bed wall of the cargo area of the vehicle; and
a connector comprising an insert configured to be placed in between the first bed rail section and the second bed rail section, the connector comprises a coupler configured to engage an engagement section of the first bed rail section and an engagement section of the second bed rail section to join together the first rail section and the second rail section in an elongated formation, wherein a cross section of the insert substantially matches a cross section of the first bed rail section and/or a cross section of the second bed rail section.

2. The tonneau cover bed rail assembly according to claim 1, wherein a seal is provided between the insert and an end of the first bed rail section or an end of the second bed rail section.

3. The tonneau cover bed rail assembly according to claim 1, wherein the first bed rail bed section comprises a first drain channel, the second bed rail section comprises a second drain channel, and the insert comprises an insert drain channel, and
wherein the first drain channel, the second drain channel, and the insert drain channel are connected together after the coupler engages the engagement section of the first bed rail section and the engagement section of the second bed rail section.

4. The tonneau cover bed rail assembly according to claim 3, wherein the first bed rail section and the second bed rail section extend along a common longitudinal axis.

5. The tonneau cover bed rail assembly according to claim 1, wherein the insert comprises a first projection that is configured to engage an engagement opening defined in an end of the first bed rail section.

6. The tonneau cover bed rail assembly according to claim 5, wherein the insert comprises a second projection that is configured to engage an engagement opening defined in an end of the second bed rail section.

7. The tonneau cover bed rail assembly according to claim 1, wherein the coupler has a T-shaped cross section.

8. The tonneau cover bed rail assembly according to claim 1, wherein the engagement section of the first bed rail section and/or the engagement section of the second bed rail section comprises a channel having a finger into which the coupler is configured to be slid into during assembly of the tonneau cover bed rail assembly.

9. The tonneau cover bed rail assembly according to claim 1, wherein the coupler has a Y-shaped cross section.

10. The tonneau cover bed rail assembly according to claim 1, wherein the coupler has a U-shaped cross section.

11. The tonneau cover bed rail assembly according to claim 1, wherein the insert has one or more supports that engage the first bed rail section, the second bed rail section, or both.

12. A tonneau cover bed rail assembly comprising:
a first bed rail section comprising a first drain channel;
a second bed rail section comprising a second drain channel; and
a connector configured to join together the first bed rail section and the second bed rail section, the connector comprises at least one seal configured to be arranged between an end of the first bed rail section and/or between an end of the second bed rail section, the connector comprises an insert comprising an insert drain channel;
wherein the connector comprises a coupler, the coupler is configured to engage an engagement section of the first bed rail section and an engagement section of the second bed rail section;
wherein after the connector joins together the first rail section and the second rail section, the first drain channel, the second drain channel, and the insert drain channel are arranged along a common axis; and
wherein the tonneau cover bed rail assembly is configured to extend at least partially along a length of a bed wall of cargo area of a pickup truck.

13. The tonneau cover bed rail assembly according to claim 12, wherein the at least one seal extends at least partially around the insert drain channel.

14. The tonneau cover bed rail assembly according to claim 12, wherein the coupler has a T-shaped cross section.

15. The tonneau cover bed rail assembly according to claim 12, wherein the coupler has a Y-shaped cross section.

16. The tonneau cover bed rail assembly according to claim 12, wherein the coupler has a U-shaped cross section.

17. A tonneau cover bed rail assembly comprising:
a first bed rail section comprising a first drain channel, and configured for attachment to a bed wall of a cargo area of a vehicle, the first bed rail section comprising a region configured to support a tonneau cover when the tonneau cover is in a closed position and be free of contact with the tonneau cover when the tonneau cover is in an open position;
a second bed rail section comprising, a second drain channel; and a coupler configured to engage an engagement section of the first bed rail section and an engagement section of the second bed rail section;

wherein after the coupler engages the first bed rail section and the second bed rail section, the first drain channel and the second drain channel are generally aligned along a common axis;

wherein the tonneau cover bed rail assembly comprises an insert between the first bed rail section and the second bed rail section and a seal between the first bed rail section and the second bed rail section.

\* \* \* \* \*